United States Patent

[11] 3,622,820

| [72] | Inventor | Ove Tjernstrom<br>Vretstorp, Sweden |
|---|---|---|
| [21] | Appl. No. | 73,804 |
| [22] | Filed | Sept. 21, 1970 |
| [45] | Patented | Nov. 23, 1971 |
| [73] | Assignee | Allmanna Svenska Elektriaka Aktiebolaget<br>Vasteras, Sweden |
| [32] | Priority | Sept. 30, 1969 |
| [33] | | Sweden |
| [31] | | 13,416/1969 |

[54] ROTOR COOLING SYSTEM COMPRISNG MEANS FOR AVOIDING THERMAL UNBALANCE IN A LIQUID-COOLED ELECTRICAL MACHINE
3 Claims, 3 Drawing Figs.

[52] U.S. Cl. .................................................. 310/53,
310/54, 310/64, 29/598, 310/42
[51] Int. Cl. ............................................. H02k 9/19
[50] Field of Search ......................................... 310/53, 54,
64, 42; 73/458, 468; 74/573; 29/598

[56] References Cited
UNITED STATES PATENTS
| 3,163,789 | 12/1964 | Rosenberg.................. | 310/53 |
| 3,526,794 | 9/1970 | Glider et al. ................ | 310/54 |

Primary Examiner—D. X. Sliney
Attorney—Jennings Bailey, Jr.

ABSTRACT: In a liquid-cooled electric machine, a rotor-cooling system is provided for avoiding thermal unbalance. This includes a number of cooling channels which run axially in the rotor and a distribution chamber for coolant arranged outside of the coil ends of the rotor winding, to which the cooling channels are connected by tubes. Each tube passes in a liquid-type way through two opposed walls of the distribution chamber and has at least one opening between the walls into the interior of the chamber. The opening is in the form of an elongated slot and its size may be varied by a pistonlike member which can be adjusted longitudinally of the tube to cover more or less of the opening.

PATENTED NOV 23 1971 3,622,820

INVENTOR.
OVE T. JERNSTROM
BY
Jennings Bailey

ROTOR COOLING SYSTEM COMPRISNG MEANS FOR AVOIDING THERMAL UNBALANCE IN A LIQUID-COOLED ELECTRICAL MACHINE

The present invention relates to a rotor cooling system in a liquid-cooled electric machine comprising a plurality of cooling channels which run axially in the rotor and are arranged through a plurality of tubes for cooling liquid, to connect with a distribution chamber for coolant arranged outside the coil ends of the rotor winding.

THE PRIOR ART

In water-cooled rotors where there is direct contact between the coolant and the parts being cooled, insufficient cooling has considerably more effect on the temperature of the rotor iron than with more indirect cooling. It is therefore necessary to be able to regulate the temperature of the rotor body, that is, its cooling, in order to compensate for any asymmetry which might result in deformation of the rotor body and thus cause impermissible vibrations during rotation. In order to regulate cooling of the various parts of the rotor body it is desirable to be able to throttle the flow of water through individual cooling channels, particularly cooling channels running through the rotor iron which produce direct cooling of the iron.

A rotor-cooling system which enables thermal balancing of the rotor is described in U.S. Pat. No. 3,163,789. In a machine according to this patent the cooling channels running in the rotor iron are throttled adjustable by means of screw bolts arranged radially through the rotor iron, the angle of which determines the hydraulic resistance in the cooling channel. Thermal balance achieved according to this principle means that the rotor must be assembled and dismantled many times during the adjusting process since the adjustment screws are very difficult to get at. Furthermore, the use of such an arrangement in a water-cooled machine would hardly satisfy the great demands placed on the tightness of the cooling system in such a machine.

SUMMARY OF THE INVENTION

The above-mentioned disadvantages are avoided in a rotor-cooling system according to the invention, which is characterized in that each tube is inserted in a liquidtight manner into the distribution chamber through a first wall and led out of the chamber through a second wall, the part of the tube located in the distribution chamber being provided with a number of openings through which the tube is in hydraulic connection with the distribution chamber, the end of the tube lying outside said second wall of the distribution chamber being closed and provided with an internal body fixed in such a position in relation to said openings that is determines the hydraulic resistance between the tube and the water-distributing chamber.

BRIEF DESCRIPTION OF THE DRAWINGS

In the following the invention will be described with reference to the accompanying drawings in which.

DESCRIPTION OF THE PREFERRED EMBODIMENTS

Figure 1:
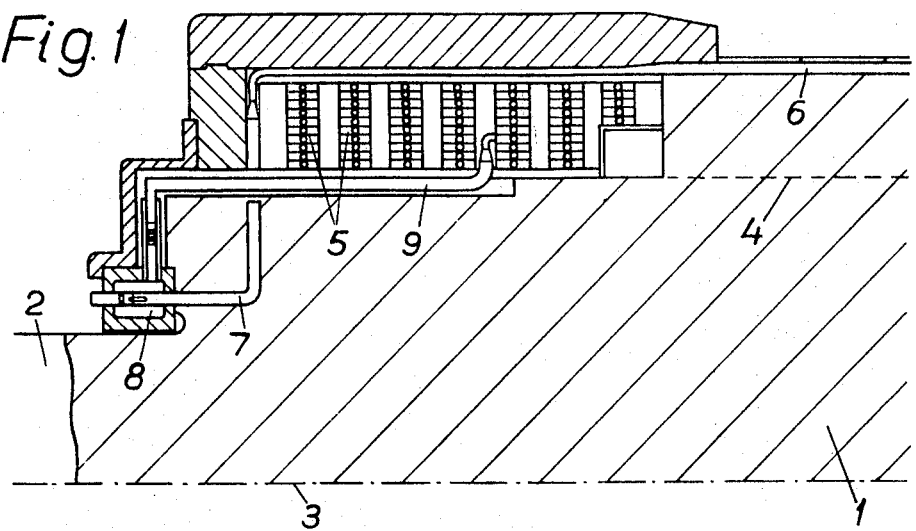
FIG. 1 shows in axial cross section a detail of a water-cooled rotor provided with a cooling system according to the invention.

In the drawings, 1 designates a rotor core in a turbogenerator, 2 the rotor shaft, 3 the center line of the rotor, 5 the coil ends of the rotor winding. The broken line 4 indicates the bottom of a winding shot and 6 designates a liquid channel running through a rotor tooth and intended to cool the rotor iron. Several teeth are provided with such channels. Each channel 6 is connected by an inlet tube 7 to an annular liquid-distributing chamber 8. The liquid-distributing chamber 8 is also in connection with a plurality of outlet tubes 9 for a winding cooling system formed by cooling channels running axially in the rotor conductors. The coolant is supplied to the cooling system of the windings at the rotor end not shown in the drawings, passes through directly cooled rotor conductors, is supplied to the distribution chamber 8 through the outlet tubes 9 and then flows through the inlet tubes 7 and the cooling channels 6 arranged in the rotor iron, back to the rotor end not shown in the drawings. The coolant tube 7 goes in through an annular wall 10 of the cooling chamber, straight through the cooling chamber and out through a second annular wall 11 of the cooling chamber, the tube 7 being welded in a liquid-tight manner to the walls 10 and 11 by the weld connections 12 and 13. The part of the tube located in the liquid-distributing chamber 8 is provided with a number of openings 14 by means of which the tube is in hydraulic connection with the chamber 8. The tube 7 surrounds a piston 15 which is provided with an annular slot 16 with sealing ring 17. In the arrangement shown in FIG. 2 the end of the tube 7 outside the wall 11 is provided with an external thread 18 and a member 19 which screws on and which is in watertight mechanical communication with one end of the piston 15. The mechanical connection is intended to transmit in the longitudinal direction of the piston forces operating between the screw member and the piston, but not turning movements. The connection is also detachable so that, if desired, the screw member can be removed without the position of the piston being disturbed. By adjusting the screw member 19 in different angular positions the piston 15 can be made to cover the opening 14 to a greater or lesser extent, so that the desired degree of throttling can be adjusted. Since the opening 14 is in the form of a long and relatively narrow gap, and since the space available for the threaded part of the tube 7 is of corresponding length, excellent accuracy of adjustment is achieved.

Figure 2:
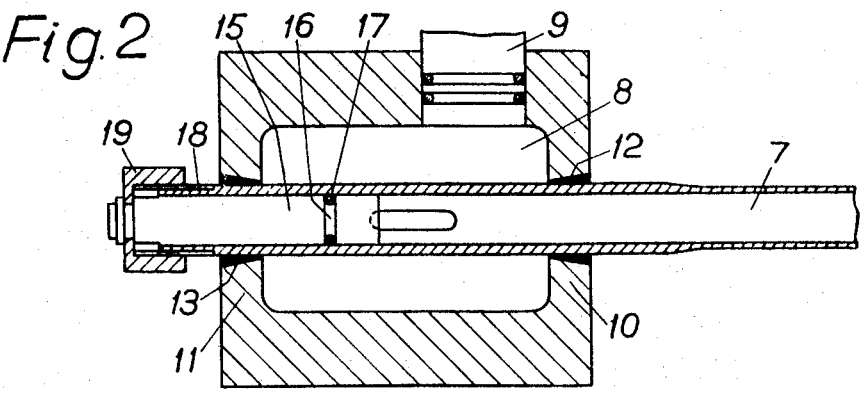
FIG. 2 and 3 show in section through a distribution chamber two variants of the thermal balancing means.

In certain cases it may be advisable to utilize the embodiment of the balancing means shown in FIG 2 even when the machine has been adjusted and put in regular operation. Possible the arrangement may be supplemented by providing the screw member 19 with a surrounding sealing compound or metal fusion seal.

Figure 3:
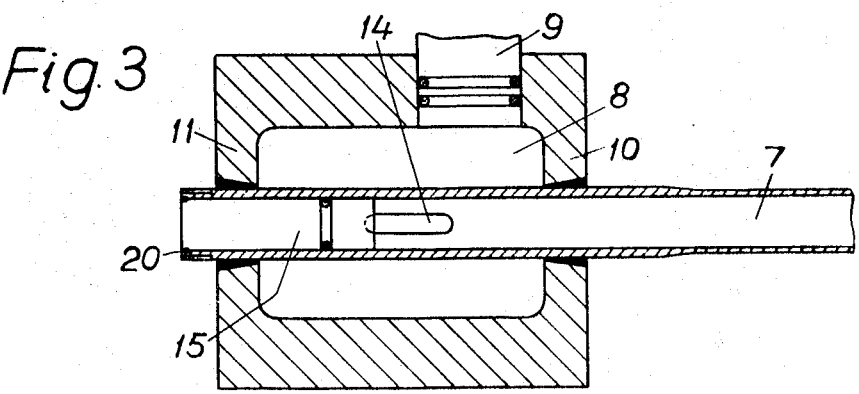

The greatest safety against leakage is achieved, however, if the balancing device is utilized in the form shown in FIG. 2 only as long as the thermal balancing is not yet finalized and then modified to the form shown in FIG. 3 before the machine is put into regular operation. In FIG. 3, 20 designates an annular welding seam which together with the piston 15 provides an absolutely reliable sealing of the tube end through the wall 11. At the same time the position of the piston is securely fixed in relation to the opening 14. This modification may suitably be carried out by welding the correctly adjusted piston 15 to the tube 7 by means of a number of welding points equally spaced from the end of the pipe and between the screw member 19 and wall 11. The pipe 7 and piston 15 are then cut transversely through these welding points or in their immediate vicinity, after which the annular welding seam 20 is applied.

Instead of cutting the pipe and piston before the annular welding seam is applied, it is possible simply to remove the screw member 19 and then weld the piston 15 to the end of the water pipe 7. Before the screw member 19 is removed, a clamp may be screwed around the pipe end so that the piston 15 is clamped firmly in position, if increased assurance that the piston 15 will not move is required.

A rotor cooling system according to the invention can be arranged in a number of other ways than those described in connection with the drawings. For instance it is possible to use a rotating body instead of the piston 15. In this case the influence of the body on the hydraulic resistance between the pipe 7 and distribution chamber is dependent on the angle of turning. The embodiments described however, are considered particularly advantageous.

When using the invention as described above the flow of water in cooling channels intended for direct cooling of the rotor iron is adjusted. The invention is also applicable to cooling channels in the rotor conductors.

I claim:

1. In a liquid-cooled electric machine, a rotor-cooling system for avoiding thermal unbalance comprising a plurality of colling channels which run axially in the rotor, a distribution chamber for coolant arranged outside the coil ends of the rotor winding, a plurality of tubes connecting said cooling channels to said distribution chamber, each tube passing in a liquidtight manner into the distribution chamber through a first wall and out of the distribution chamber through a second wall, the part of the tube located in the distribution chamber being provided with at least one opening through which the tube connects with the distribution chamber, the end of the tube lying outside said second wall of the distribution chamber being closed and provided with an internal body secured in such a position in relation to said opening that it determines the size of the opening between the tube and the water-distributing chamber.

2. Cooling system according to claim 1, in which said tube end is provided with a thread, an adjustment member on the tube end engaging said thread and operatively connected with said member.

3. Cooling system according to claim 1, in which said body comprises a piston closely fitting the inside of the tube and secured by a weld connection between the tube and the piston.

* * * * *